No. 792,046. Patented June 13, 1905.

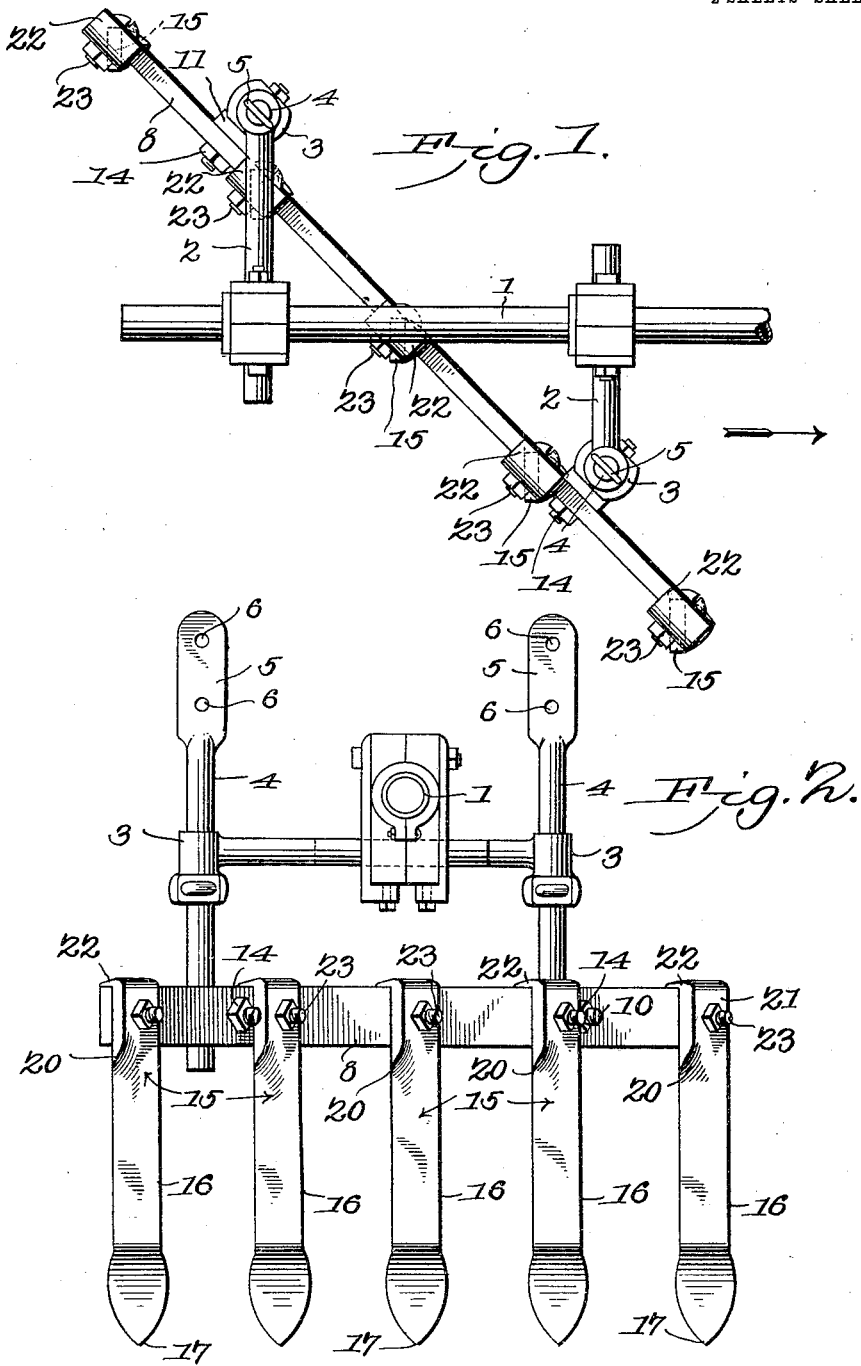

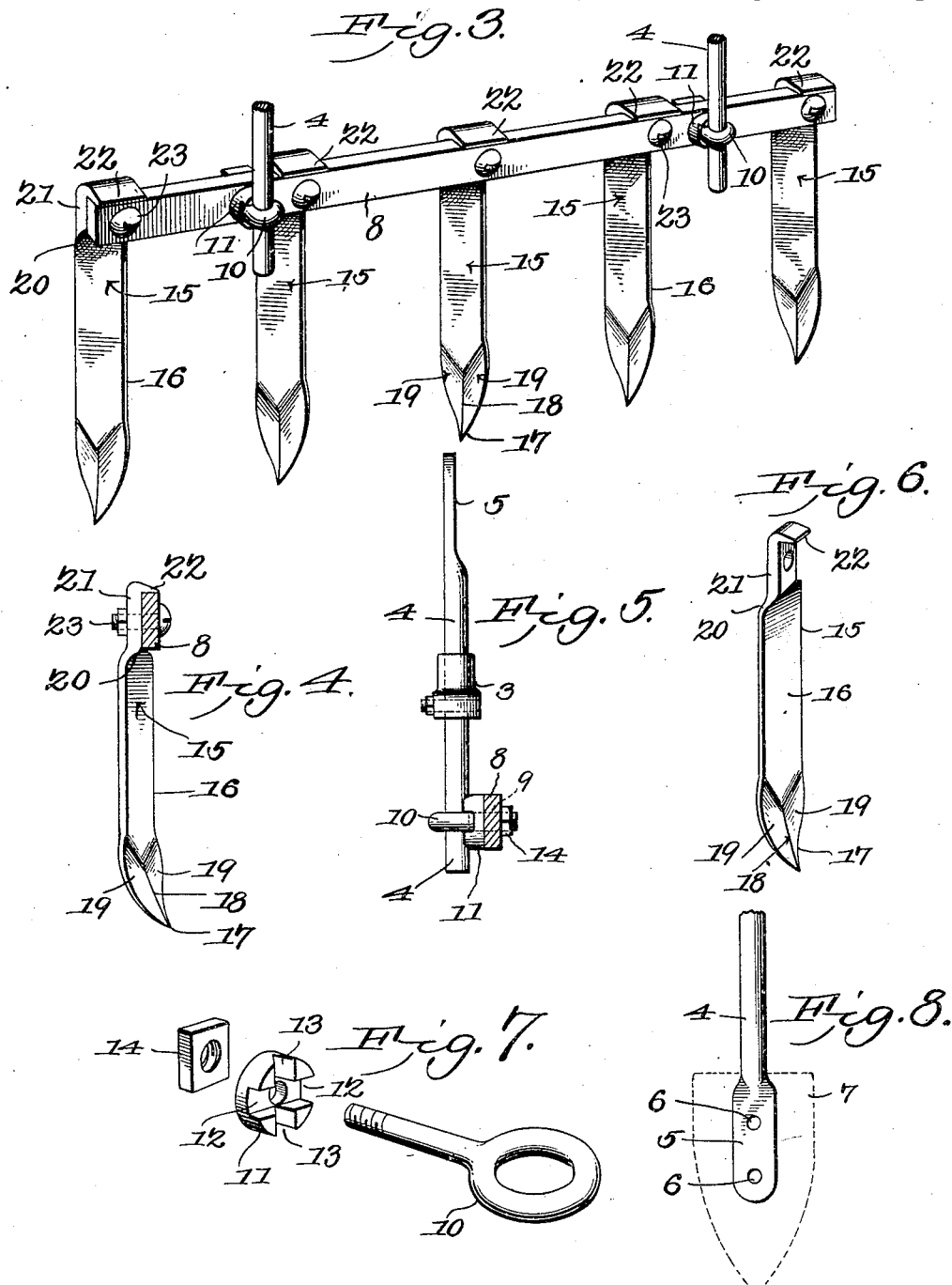

UNITED STATES PATENT OFFICE.

ANDREW JACKSON JOYCE, OF TEMPLE, TEXAS.

CULTIVATOR ATTACHMENT.

SPECIFICATION forming part of Letters Patent No. 792,046, dated June 13, 1905.

Application filed March 15, 1905. Serial No. 250,252.

*To all whom it may concern:*

Be it known that I, ANDREW JACKSON JOYCE, a citizen of the United States, residing at Temple, in the county of Bell and State of Texas, have invented a new and useful Cultivator Attachment, of which the following is a specification.

This invention relates to an improved cultivator attachment adapted to be used as a substitute for the plows ordinarily employed in cultivators, the invention having among its objects to improve and to simplify the construction and operation of the device.

Another object of the invention is to provide an implement which may be successfully used upon crops while the plants are as yet extremely young and tender, the device being of such a nature as to enable the soil to be stirred, broken, and agitated to any desired depth without danger of throwing loose dirt or clods in the direction of the plants, which might thereby be injured, and also without danger of bedding the land.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that changes and modifications within the scope of the invention may be made when such changes and modifications may be resorted to without departing from the spirit or sacrificing the efficiency of the device.

In said drawings, Figure 1 is a top plan view of a cultivator attachment constructed in accordance with the principles of the invention. Fig. 2 is a rear elevation of the same. Fig. 3 is a perspective front view of the attachment. Fig. 4 is a side elevation of one of the teeth or earth-engaging members, showing also in section the supporting-bar to which said tooth is attached. Fig. 5 is a side elevation illustrating the supporting means for the tooth-carrying beam, the latter being shown in cross-section. Fig. 6 is a perspective detail view of one of the teeth. Fig. 7 is a perspective detail view showing the members for connecting the tooth-carrying bar with its supporting means. Fig. 8 is a detail view of one of the shanks or supporting members.

Corresponding parts in the several figures are indicated throughout by similar characters of reference.

1 designates a gang-carrying frame-bar of an ordinary wheel-cultivator, which is provided with laterally-extending arms 2 2, terminating in sleeves 3, in which the plow-carrying shanks or standards are ordinarily mounted. Said shanks or standards when made of ordinary round iron, as indicated in the drawings, where said shanks have been designated 4, may be utilized as supporting means for the improved cultivator attachment which constitutes the present invention. When thus used, said shanks or standards will be simply inverted, as clearly shown in Fig. 2 of the drawings, and the plow-blades or earth-engaging members may be detached from said shanks, the extremities of which are flattened, as shown at 5, and provided with apertures 6 for the passage of bolts or equivalent fastening means whereby the ordinary plow-blades may be connected therewith, as indicated in dotted lines at 7 in Fig. 8 of the drawings. When the plow shanks or standards are not suited to serve as supporting members for the attachment, ordinary round iron bars of suitable dimensions may be used. To avoid confusion, the supporting members will be hereinafter referred to simply as shanks 4.

The improved attachment comprises an iron bar or a bar of any suitable material, said bar 8 being preferably of rectangular cross-section. The bar 8 is provided with apertures 9 for the passage of eyebolts 10, upon the shanks of which are placed washers 11, having transverse recesses 12 and 13 at right angles to each other, the recesses 12 engaging the eyes of the eyebolts and the recesses 13, which are V-shaped in cross-section, engaging the shanks 4, so that by tightening the nuts 14 upon the eyebolts the shanks 4 will be pinched by the walls of the recesses 13 and will be securely retained with relation to the bar 8, the forward face of which engages the flat side of the washer 11. It will be seen that when the shanks 4 are secured in the sleeves 3 a slight loosening of the nuts 14 will enable the bar 8 to be vertically adjusted, and the adjustment may be independent at the two ends of the bar, so that the latter may be supported in an inclined or tilted position, if desired.

The teeth or earth-engaging members of the improved device are not to be understood as being in the nature of harrow-teeth; but rather in the nature of bull-tongue plows of small size. It is preferred that said earth-engaging members be manufactured from bar-steel of suitable dimensions and of rectangular cross-section, each of the said teeth or earth-engaging members 15 being composed of a body 16, the lower end of which is swaged to form a plow-point 17, having a distinct central ridge 18 and side wings 19, the plow, the point of which is curved forwardly, being formed at the lower end of the body 16. The upper end of the latter is twisted, as shown at 20, and it forms a shank 21, provided at its upper edge with a flange 22, adapted to overhang the upper edge of the bar 8 with which the earth-engaging member 15 is connected by means of a bolt 23, passing through registering apertures in the said bar and shank.

It will be well understood that the bar 8, which constitutes the tooth-carrying beam of the device, will be disposed in an oblique position with regard to the line of progress, as indicated by an arrow in Fig. 1 of the drawings, there being in each cultivator two such bars, which converge in a rearward direction, but are spaced apart, so as to operate on opposite sides of the row of plants. Owing to the twist 20 at the upper end of each member 15, the said members will be disposed with the points of the plows facing forwardly in a proper soil-engaging position.

From the foregoing description, taken in connection with the drawings hereto annexed, the operation and advantages of this invention will be readily understood. Two of the tooth-carrying bars are to be attached to the gang-carrying frame-beams in place of the plows ordinarily connected therewith, and the teeth with which the bars are equipped will be adapted to enter into the soil to any desired depth and to stir and loosen the same, killing and eradicating weeds and grass and cultivating the soil without bedding or ridging the land.

A cultivator equipped with this improved attachment may be operated with perfect safety much sooner than the ordinary gang-cultivator, and the land may be kept level and the crop in a clean and thoroughly cultivated condition throughout the growing season.

The device may be very easily and quickly applied to or detached from a cultivator of ordinary construction. It is simple, inexpensive, and of great practical utility.

Having thus described the invention, what is claimed is—

1. A cultivator attachment comprising a tooth-carrying bar having apertures, eyebolts engaging said apertures, washers upon said eyebolts having flat sides engaging the tooth-carrying bar and provided on their opposite sides with grooves at right angles to each other, one of said grooves engaging the eye of the bolt and the other groove being of V-shaped cross-section, a shank extending through the eyebolt and engaging the V-shaped groove, and a tightening-nut upon the eyebolt.

2. A gang-carrying frame-bar having laterally-extending arms terminating in sleeves, shanks supported in said sleeves, and a tooth-carrying bar connected adjustably with said shanks by means including eyebolts and washers, the latter provided with V-shaped grooves engaging the said shanks.

In testimony that I claim the foregoing as my own I have hereto affixed my signature in the presence of two witnesses.

ANDREW JACKSON JOYCE.

Witnesses:
H. J. TANDY,
T. M. MCDONNOLD.